US008171813B2

United States Patent
Gumpoltsberger et al.

(10) Patent No.: US 8,171,813 B2
(45) Date of Patent: *May 8, 2012

(54) DUAL CLUTCH TRANSMISSION

(75) Inventors: Gerhard Gumpoltsberger, Friedrichshafen (DE); Juergen Wafzig, Eriskirch (DE); Matthias Reisch, Ravensburg (DE); Wolfgang Rieger, Friedrichshafen (DE); Ralf Dreibholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 174 days.

This patent is subject to a terminal disclaimer.

(21) Appl. No.: 12/681,924

(22) PCT Filed: Oct. 8, 2008

(86) PCT No.: PCT/EP2008/063425
§ 371 (c)(1), (2), (4) Date: Apr. 7, 2010

(87) PCT Pub. No.: WO2009/050073
PCT Pub. Date: Apr. 23, 2009

(65) Prior Publication Data
US 2010/0242646 A1    Sep. 30, 2010

(30) Foreign Application Priority Data
Oct. 15, 2007   (DE) .......................... 10 2007 049 259

(51) Int. Cl.
*F16H 3/08* (2006.01)
(52) U.S. Cl. ........................................... 74/330; 74/331
(58) Field of Classification Search .................... 74/664, 74/665 R, 325, 329, 330, 331, 340
See application file for complete search history.

(56) References Cited

U.S. PATENT DOCUMENTS

| 6,244,123 B1 | 6/2001 | Hegerath et al. |
| 7,246,536 B2 | 7/2007 | Baldwin |

(Continued)

FOREIGN PATENT DOCUMENTS

| DE | 38 22 330 A1 | 7/1989 |
| DE | 102 39 540 A1 | 3/2004 |
| DE | 103 05 241 A1 | 9/2004 |
| DE | 10 2004 001 961 A1 | 8/2005 |
| DE | 10 2004 012 909 A1 | 10/2005 |

(Continued)

OTHER PUBLICATIONS

Prof. Dr. P. Tenberge; "Doppelkupplungsgetriebe in Planetenradbauweise Getriebestrukturen zwischen Automatik-und Doppelkupplungsgetrieben" Wissenportal baumaschine de 3 2007.

*Primary Examiner* — Justin Holmes
(74) *Attorney, Agent, or Firm* — Davis & Bujold, P.L.L.C.

(57) ABSTRACT

A double clutch transmission with two clutches that have inputs connected to a drive shaft and outputs which are each connected to one of first and second transmission input shafts. Fixed gears are coupled to the input shafts and engage idler gears. Several coupling devices connect the idler gears to a respective countershaft which have an output gear that couples with an output shaft such that forward and reverse gears can be shifted. First and second dual gear planes each comprise two idler gears supported by a respective countershaft, and one fixed gear. In each of the first and the second gear planes, at least one idler gear is used for two gears. First and second single gear planes each comprise an idler gear and a fixed gear such that at least one winding-path gear can be shifted via at least one, non-engaged coupling device, assigned to one of the output gear.

12 Claims, 8 Drawing Sheets

U.S. PATENT DOCUMENTS

| | | |
|---|---|---|
| 7,287,442 B2 | 10/2007 | Gumpoltsberger |
| 2006/0054441 A1 | 3/2006 | Ruedle |
| 2010/0206106 A1* | 8/2010 | Gumpoltsberger et al. .... 74/331 |
| 2010/0212441 A1* | 8/2010 | Gumpoltsberger et al. .... 74/331 |
| 2010/0257960 A1* | 10/2010 | Rieger et al. .................... 74/330 |
| 2010/0257967 A1* | 10/2010 | Rieger et al. .................... 74/331 |
| 2010/0294060 A1* | 11/2010 | Gumpoltsberger et al. .... 74/331 |

FOREIGN PATENT DOCUMENTS

| | | |
|---|---|---|
| DE | 10 2005 028 532 A1 | 12/2006 |
| DE | 10 2005 045 005 A1 | 3/2007 |
| FR | 2 880 088 A1 | 6/2006 |
| GB | 2 424 250 A | 9/2006 |
| WO | 2005/068875 A3 | 7/2005 |
| WO | 2005/093289 A1 | 10/2005 |

* cited by examiner

Fig. 2

| G | ZS | K1 | K2 | A | B | C | D | E | F | I | K | S_ab1 | S_ab2 |
|---|---|---|---|---|---|---|---|---|---|---|---|---|---|
| G1 | _i_3_i_4_i_2 |  | 1 | 1 |  |  |  | 1 |  |  |  |  | 1 |
| G2 | _i_2 | 1 |  | 1 |  |  |  | 1 |  |  |  | 1 | 1 |
| G3 | _i_3 | 1 | 1 |  |  | 1 |  |  |  |  |  | 1 | 1 |
| G4 | _i_4 |  | 1 |  |  | 1 |  |  |  |  |  | 1 | 1 |
| G5 | _i_5 |  | 1 |  |  |  | 1 |  |  |  |  | 1 | 1 |
| G6 | _i_6 | 1 |  |  |  |  |  |  | 1 |  |  | 1 | 1 |
| G7 | _i_4_i_3_i_5 | 1 |  | 1 |  | 1 | 1 |  |  |  |  |  | 1 |

R-GEAR

| R1 | _i_R |  |  |  | 1 |  |  |  |  |  |  | 1 | 1 |
| R2 | _i_5_i_6_i_R |  |  | 1 | 1 |  | 1 |  | 1 |  |  | 1 | 1 |

LOW SPEED GEAR

| C1 | _i_2_i_5_i_3 | 1 |  |  |  |  |  |  |  | 1 | 1 | 1 | 1 |

OVERDRIVE GEAR

| O1 | _i_5_i_2_i_4 |  | 1 |  |  | 1 |  |  |  | 1 | 1 | 1 | 1 |

Fig. 4

| G | ZS | K1 | K2 | A | B | C | D | E | F | I | K | S_ab1 | S_ab2 |
|---|---|---|---|---|---|---|---|---|---|---|---|---|---|
| G1 | i_3·i_4·i_2 |  | 1 | 1 |  | 1 |  | 1 |  |  |  |  | 1 |
| G2 | i_2 | 1 |  | 1 |  |  |  | 1 |  |  |  |  | 1 | 1 |
| G3 | i_3 | 1 |  |  | 1 |  |  | 1 |  |  |  |  | 1 | 1 |
| G4 | i_4 | 1 | 1 | 1 |  |  |  |  |  |  |  |  | 1 | 1 |
| G5 | i_5 |  | 1 |  |  |  | 1 |  |  |  |  |  | 1 | 1 |
| G6 | i_6 | 1 |  |  |  |  |  |  |  | 1 |  |  | 1 | 1 |
| G7 | i_4·i_3·i_5 | 1 |  | 1 |  | 1 |  |  |  |  |  |  | 1 | 1 |

R – GEAR

| R1 | i_R | 1 |  |  | 1 | 1 |  |  |  |  |  |  |  | 1 |
| R2 | i_5·i_6·i_R |  | 1 |  | 1 | 1 |  |  |  |  |  |  | 1 | 1 |

LOW SPEED GEAR

| C1 | i_2·i_5·i_3 | 1 |  | 1 |  |  |  |  |  |  | 1 | 1 | 1 | 1 |

OVERDRIVE GEAR

| O1 | i_5·i_2·i_4 |  | 1 |  |  | 1 |  |  |  |  |  | 1 | 1 | 1 |

| G | ZS | K1 | K2 | A | B | C | D | E | F | I | K | S_ab1 | S_ab2 |
|---|---|---|---|---|---|---|---|---|---|---|---|---|---|
| G1 | i_3·i_6·i_2 | | 1 | 1 | | 1 | | | | | | | 1 |
| G2 | i_2 | 1 | | | | | | 1 | | | | 1 | 1 |
| G3 | i_3 | | 1 | 1 | | | | 1 | | | | 1 | 1 |
| G4 | i_4 | 1 | | | | | | | 1 | | | 1 | 1 |
| G5 | i_5 | | 1 | | | | 1 | | | | | 1 | 1 |
| G6 | i_6 | 1 | | | | 1 | 1 | | | | | 1 | 1 |
| G7 | i_5·i_4·i_6 | | 1 | | | 1 | 1 | | 1 | | | 1 | |
| R- GEAR | | | | | | | | | | | | | |
| R1 | i_R | 1 | | | 1 | | | | | | | 1 | 1 |
| OVERDRIVE GEAR | | | | | | | | | | | | | |
| O1 | i_5·i_2·i_4 | | 1 | 1 | | | | | | 1 | | 1 | 1 |
| O2 | i_6·i_3·i_5 | 1 | | | | | 1 | | | | 1 | | 1 |

| G | ZS | K1 | K2 | A | B | C | D | E | F | I | K | S_ab1 | S_ab2 |
|---|---|---|---|---|---|---|---|---|---|---|---|---|---|
| G1 | i_5·i_6·i_2 | | 1 | | 1 | | | | 1 | | | 1 | 1 |
| G2 | i_2 | 1 | | | 1 | | | | | | | 1 | 1 |
| G3 | i_3 | | 1 | | | | 1 | | | | | 1 | 1 |
| G4 | i_4 | 1 | | | | 1 | | | | | | 1 | 1 |
| G5 | i_5 | | 1 | | | | 1 | | | | | 1 | 1 |
| G6 | i_6 | 1 | | | | | | | 1 | | | 1 | 1 |
| G7 | i_4·i_3·i_5 | 1 | | 1 | | | 1 | | | | | 1 | 1 |

R- GEAR

| | | | | | | | | | | | | | |
|---|---|---|---|---|---|---|---|---|---|---|---|---|---|
| R1 | i_5·i_R·i_2 | | 1 | | 1 | | | | | | 1 | 1 | 1 |
| R2 | i_5·i_R·i_4 | | 1 | | | 1 | | | | | 1 | 1 | 1 |
| R3 | i_5·i_R·i_6 | | 1 | | | | | | | | 1 | 1 | 1 |
| R4 | i_R | 1 | | | | | | 1 | | | 1 | | 1 |

OVERDRIVE GEAR

| | | | | | | | | | | | | | |
|---|---|---|---|---|---|---|---|---|---|---|---|---|---|
| O1 | i_3·i_2·i_6 | | | | | | | | 1 | 1 | | 1 | 1 |

DUAL CLUTCH TRANSMISSION

This application is a National Stage completion of PCT/EP2008/063425 filed Oct. 8, 2008, which claims priority from German patent application serial no. 10 2007 049 259.8 filed Oct. 15, 2007.

FIELD OF THE INVENTION

The present invention relates to a dual clutch transmission for a motor vehicle.

BACKGROUND OF THE INVENTION

Known from the publication DE 103 05 241 A1 is a 6-speed or 7-speed dual clutch transmission. The dual clutch transmission comprises two clutches, each linked with their inputs to the drive shaft and each with their output to a respective one of the two transmission input shafts. The two transmission input shafts are coaxially positioned with each other. In addition, two countershafts are positioned axially parallel to the transmission input shafts, their idler gears meshing with the fixed gears of the transmission input shafts. Furthermore, coupling devices, that are axially movable, are connected in a rotationally fixed manner to the countershaft to shift the respective gear wheels. Each selected ratio is transferred by the drive gear wheels to a differential transmission. To achieve the desired gear ratio steps in this known dual clutch transmission, a vast number of wheel planes are required, so that a significant amount of installation space is needed.

In addition, a spur gear variable-speed transmission is known through the publication DE 38 22 330 A1. The spur gear variable-speed transmission comprises a dual clutch, switchable under load, where one part is linked with a drive input shaft and the other part with a hollow drive shaft, positioned rotatable on the drive input shaft. For certain gear ratios, the drive input shaft can be coupled with the hollow drive shaft through a shifting device.

Known from the publication DE 10 2004 001 961 A1 is a power transmission with two clutches, each of which are assigned to a partial transmission. The transmission input shafts of the two partial transmissions are positioned coaxial to each other and mesh, via fixed gear wheels, with idler gears of the designated countershaft. The respective idler gears of the countershafts can be connected in a rotationally fixed manner with the respective countershaft by designated shifting devices. The particular idle wheels of the countershaft can be connected in a rotationally fixed manner via the assigned shifting devices with the associated countershaft. A 7-gear transmission, among other things, is known from this publication in which an additional shift element is provided to link the two transmissions input shafts to establish an additional transmission stage. The 7-gear transmission requires in this embodiment at least six wheel planes in the two partial transmissions, to achieve the transmission stages. This causes an unwanted extension of the construction length in the axial direction, thereby significantly limiting use in a motor vehicle.

SUMMARY OF THE INVENTION

It is the task of the present invention to propose a dual clutch transmission based on the previously described genus, in which power engaging gear ratio steps can be realized, in a cost-efficient manner and with as few parts as possible, which need little installation space.

Thus, a dual clutch transmission with two clutches, optimized with regard to installation space, is proposed, in which the inputs are connected to a drive shaft and the outputs are each linked with one of two, coaxially arranged, transmission input shafts. The dual clutch transmission comprises at least two countershafts, on which gear wheels, designed as idler gears, are rotatably positioned, and on the two transmissions input shafts are gear wheels connected in a rotationally fixed manner and designed as fixed wheels, which at least partially mesh with the idler gears. In addition, several coupling devices, or similar, are provided for connecting an idler gear with a countershaft in a rotationally fixed manner. The dual clutch transmission, in accordance with the invention, has one output gear wheel each, or constant pinion, respectively, at the two countershafts, which each are coupled with gears of a drive shaft, to connect the respective countershaft with the output, whereby several power shiftable forward gears and at least one reverse gear can be implemented.

The inventive dual clutch transmission can preferably comprise just four gear planes, whereby at least one of the two output gear wheels is connected with the respective countershaft. In this dual clutch transmission are, for instance, two dual gear planes provided and in each dual gear plane, an idler gear each, on the first and second countershaft, is assigned to a fixed gear of a transmission input shaft, whereby in each dual gear plane at least one idler gear can be used for at least two gears, and whereby, for instance two single gear planes are provided, in which an idler gear on the countershaft is assigned to a fixed gear wheel on the transmission input shaft, so that at least a winding-path gear can be shifted, via at least one. On an engaged coupling device which is assigned to one of the output gear wheels, when in the non-engaged state of the coupling device the respective output gear wheel is decoupled from the assigned countershaft. In the non-shifted or non-activated, respectively, condition, the coupling device which is assigned to the output gear wheel, is engaged so that the respective output gear wheel is torque free connected with the assigned countershaft. Due to the possible multi-use of idler gears, the proposed dual clutch transmission enables a maximum number of gear ratios, whereby, with as few gear planes as possible, preferably all forward gears and all reverse gears are power shiftable in sequential execution.

Through the use of two single gear planes, instead of a dual gear plane, meaning one fixed gear wheel is replaced by two fixed gear wheels, harmonized, progressive gear steps can be achieved in this inventive dual clutch transmission, especially for the fourth, fifth, sixth, and seventh gear. In addition, a maximum of three shifting devices are used for each countershaft, which are realized through shifting devices and/or coupling devices, such that, if necessary, only a maximum of two activating devices on each countershaft are needed. Furthermore, the last or second last gear step in this inventive dual clutch transmission can be designed higher than the respective current gear, to provide the driver with a lot of torque and drive power when shifting. Also, the highest shiftable gear can be designed as a winding-path gear.

The inventive and proposed dual clutch transmission can preferably be designed as a 7-gear transmission. Due to the reduced installation space requirements, as compared to known transmission configurations, the inventive dual clutch transmission is especially applicable in a front-transverse construction. However, other constructions are also possible, and depend on the design and the available construction of the respective motor vehicle.

Within the scope of a possible embodiment of this invention, it can be provided that, when the coupling device on the first countershaft is disengaged, the assigned output gear wheel on the first countershaft is disengaged, so that the first forward gear and the seventh forward gear can be shifted as a winding-path gear. Hereby, the first forward gear as well as the seventh forward gear can be realized, among others, via the gear wheel steps of the third and the fourth forward gear, whereby only three shifting locations or coupling devices, respectively, are required.

In accordance with a different embodiment of the invention, it can be provided, when the coupling device on the first countershaft is disengaged, the output gear wheel is decoupled from the first countershaft, so that a first forward gear as well as a second overdrive gear can be shifted, and, when the coupling device on the second countershaft is disengaged, the output gear wheel is de-coupled from the second countershaft, such that a seventh forward gear can be shifted as a winding-path gear.

A next embodiment can provide, when the coupling device on the first countershaft is disengaged, the output gear wheel is decoupled from the first countershaft, so that a seventh forward gear can be shifted, and, when the coupling device on the second countershaft is disengaged, the output gear wheel is decoupled from the second countershaft, so that a first forward gear can be shifted as a winding-path gear.

With the inventive dual clutch transmission and at least one non-engaged coupling device, winding-path gears can be realized in which the gear wheels of both partial transmissions are linked with each other, achieving hereby a flow of force through both partial transmissions. The respective, coupling device separates the respective output gear wheel from the assigned countershaft, when the coupling device is disengaged. Due to the fact that at least one output gear wheel on a countershaft can be shifted, not only can more winding-path gears can be realized compared to using just one shifting device, but also gear stepping can be better matched.

If, for instance, an additional shifting device is used in this dual clutch transmission to realize additional winding-path gears, positioning of the shifting device for coupling two defined idler gears can be varied, so that a shifting device does not necessarily need to be positioned between the idler gears which have to be coupled. Thus, other configurations of the respective shifting device are possible to optimize, for instance, the linkage to an actuator device.

It can be provided with the dual clutch transmission, in accordance with a possible embodiment, that the first gear plane, designed as dual gear plane, comprises a fixed gear wheel on the second transmission input shaft of the second partial transmission, and that the second gear plane, designed as dual gear plane, as well as the third and fourth gear plane, designed as single gear plane, comprises three fixed gear wheels on the first transmission input shaft of the first partial transmission. However, it is also possible, in a different embodiment, that the first gear plane, designed as dual gear plane, comprises a fixed gear wheel on the second transmission input shaft of the second partial transmission, and that the second, and third gear plane, designed as single gear plane, and the fourth gear plane, designed as dual gear plane, comprises three fixed gear wheels on the first transmission input shaft of the first partial transmission. Hereby, independent of the respective embodiment variation, each of the four fixed gear wheels of the transmission input shaft can be used for at least two gears. Preferably, the maximum of four shifting locations can be used on each countershaft, to get by with just maximal two actuator devices for activating the shifting locations. Also, other embodiments are possible. For instance, the configuration of the different gear wheel steps can provide, that the gear wheels steps for the third and the fifth power shiftable forward gears are located in one gear plane. Also, the gear wheel step of the second power shiftable forward gear, for instance, and at least one reverse gear can be located in one gear plane. In an advantageous way, just three idler gears are needed on a countershaft for the forward gears and, which mesh with the fixed gear wheels of the transmission input shaft, and just two idler gears are needed on the other countershaft, which also mesh with fixed gear wheels of the transmission input shafts.

For the realization of the reverse gears in this inventive dual clutch transmission, an intermediate gear wheel can be used, which, for instance, is positioned on an intermediate shaft. It is also possible, that one of the idler gears on a countershaft serves as in intermediate gear wheel for at least one reverse gear. Hereby no additional intermediate shaft is required for the reverse gears, as one of the idler gears meshes with a fixed gear wheel and an additional, shiftable idler gear on the other countershaft. Hereby, the intermediate gear wheel, required for the reverse gear, is positioned as a shiftable idler gear on a countershaft and serves, in addition, for the realization of at least an additional forward gear. The intermediate gear can always be designed as a step gear, independent of the positioning intermediate gear wheel on the countershaft or on the additional intermediate shaft.

To achieve the required gearing, the inventive dual clutch transmission can include at least one dual action coupling device, or similar, be positioned as a shifting location on each countershaft. The provided coupling devices can each, in the activated mode and dependent on the operating direction, connect an assigned idler gear with the countershaft in a rotationally fixed manner. In addition, also a single action shifting device, or similar, can be positioned on at least one countershaft as a shifting location. As coupling devices, for instance, hydraulic, electric, pneumatic, mechanically operated clutches can be used, or also interlocking claw clutches or any kind of synchronization device can be applied, which connects an idler gear with a countershaft in a rotationally fixed manner. It is also possible, that a dual action coupling device is replaced by two single action coupling devices or vice versa.

It is possible that the mentioned options for positioning the gear wheels vary, and also the number of gear wheels and the number of coupling devices are altered to realize additional load shifting and non-load shifting gears, for further reduction of installation space and costs for this inventive dual clutch transmission. Especially fixed wheels of dual gear planes can be split into two fixed wheels for two single gear planes. Hereby, the gear shifting can be improved. It is also possible, to swap the countershafts. The partial transmissions can also be swapped, meaning mirror imaging around a vertical axle. Hereby, the hollow shaft and the solid shaft are swapped. It is possible hereby to position the smallest gear wheel on the solid shaft, to further optimize the use of the available installation space. In addition, neighboring wheel planes can be swapped, to optimize, for example, a deflection of the shaft and/or to optimize the linking of a shifting actuator device. Also, the respective mounting position of the coupling devices on the wheel plane can be varied. In addition, also the direction of actuation of the coupling devices can be varied.

The numbering used in here is freely defined. It is also possible to add a low speed gear, to improve for a motor vehicle the off road characteristics or the acceleration performance. In addition, the first gear can be left out, for instance, to better optimize the entirety of the gear steps. The numbering of the gears varies through these measures accordingly.

Independent of the respective variations of the embodiments of the dual clutch transmission, the drive shaft and the output shaft can be positioned non-coaxial to each other, which enables an especially space saving configuration. For instance, the shafts which are spatially positioned spatial one after another, can also be slightly offset to each other. In that configuration, a direct gear with the transmission ratio one can be realized through meshing teeth and can be shifted, relatively free, to the fourth, fifth, or sixth gear. Different configuration options of the drive shaft and the output shaft are also possible.

The proposed dual clutch transmission is preferably equipped with an integrated output stage. The output stage can comprise a fixed gear wheel on the output shaft as an output gear wheel, which meshes with the first output gear wheel on the first countershaft, as well as with a second output gear wheel on the second countershaft. Depending on the embodiment variation, at least one of the output gear wheels is designed to be a shiftable gear wheel via a coupling device.

Advantageously, the lower forward gears and the reverse gears can be activated by a start, or shift clutch, respectively, to hereby focus higher loads on this clutch, and construct the second clutch with less need for installation space and more cost-effective. Especially, the wheel planes in the proposed dual clutch transmission can be positioned in a way that one can start, via the inner transmission input shaft or the outer transmission input shaft, hereby always a starting via the more appropriate clutch, which is also possible in a concentrically positioned, radially nested configuration of the dual clutch. Hereby and accordingly, the wheel planes can be positioned as mirror-symmetric, or swapped, respectively. It is also possible that the countershafts are swapped or positioned in a mirroring way.

Independent of the respective embodiment variations, for instance, the wheel planes of the dual clutch transmission can be swapped. It is also possible, to use instead of a dual wheel plane, two single wheel planes and/or vice versa. In addition, the two partial transmissions can be positioned as mirrored.

BRIEF DESCRIPTION OF THE DRAWINGS

Following, the present invention is further explained based on the drawings. It shows:

FIG. 2 a shift scheme of the first embodiment variation in accordance with FIG. 1;

FIG. 4 a shift scheme of the second embodiment variation in accordance with FIG. 3;

FIG. 6 a shift scheme of the third embodiment variation in accordance with FIG. 5

FIG. 8 a shift scheme of the fourth embodiment variation in accordance with FIG. 7

DETAILED DESCRIPTION OF THE PREFERRED EMBODIMENTS

Figure 1:
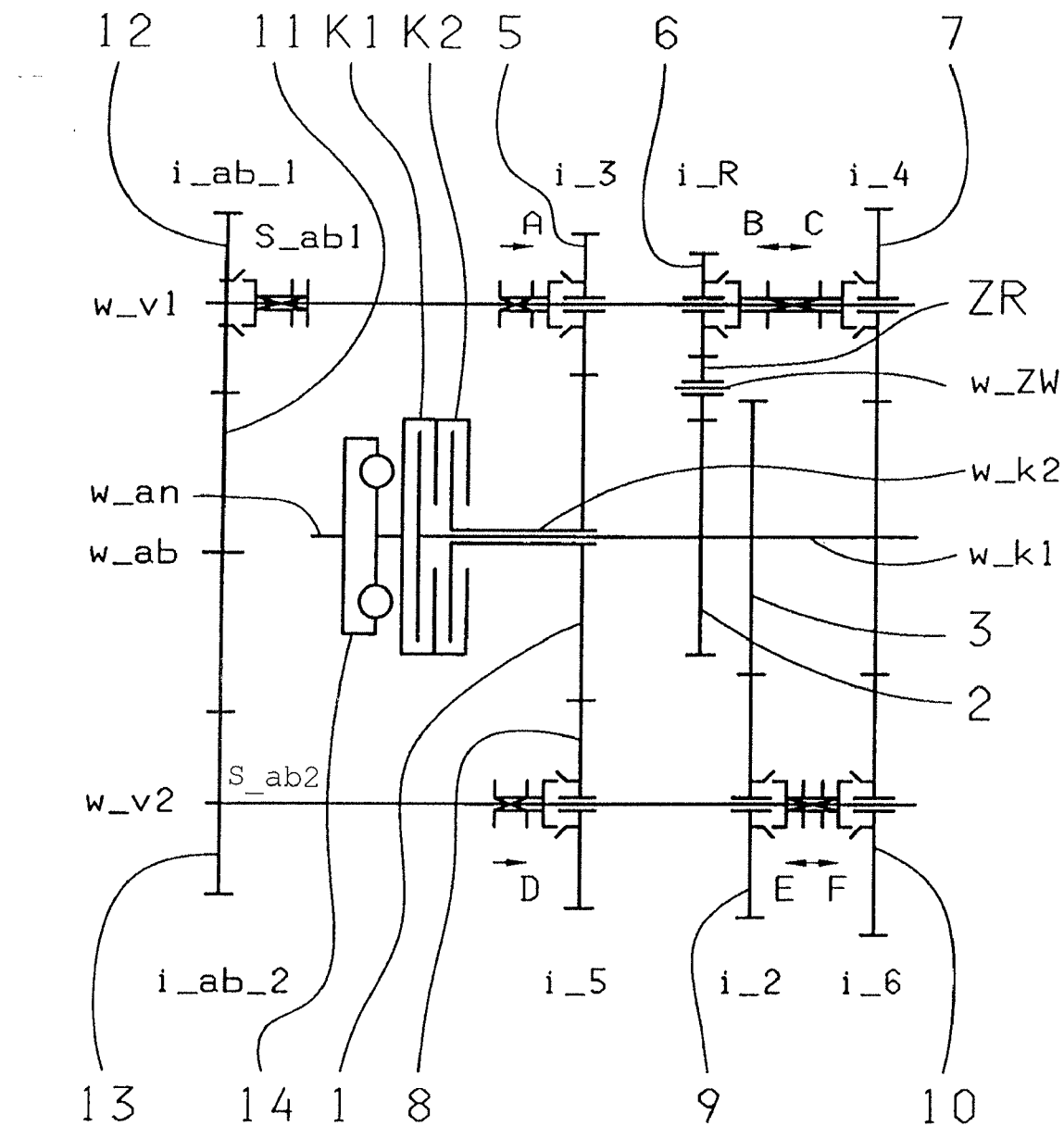
FIG. 1 a schematic view of a first embodiment variation of an invented 7-gear dual clutch transmission.

FIGS. 1, 3, 5, and 7 each show a possible embodiment variation of a 7-gear dual clutch transmission. The respective shifting schemes, in accordance with the different embodiments, are presented accordingly as tables in the FIGS. 2, 4, 6, and 8.

The 7-gear dual clutch transmission comprises, independent of the respective embodiment variations, two clutches, K1, K2, in which the input sides are connected to a drive shaft w_an, and the output sides are each connected with one of the two transmission input shafts w_K1, w_K2 which are coaxially aligned with respect to each other. Also, a torsional vibration damper 14 can be located on the drive shaft w_an. In addition, two countershafts w_v1, w_v2 are provided, on which gear wheels are rotatably positioned and designed as idler gear 5, 6, 7, 8, 9, 10. On the two transmission input shafts w_K1, w_K2, gear wheels are rotatably supported and designed as fixed wheels 1, 2, 3, 4 which at least partially mesh with the idler gears 5, 6, 7, 8, 9, 10.

To connect the idler gear wheels, 5, 6, 7, 8, 9, 10 with a respective countershaft w_v1, w_v2, several coupling devices A, B, C. D, E, F are provided on the countershafts w_v1, w_v2. In addition, the two countershafts w_v1, w_v2 comprise output gear wheels 12, 13, designed as constant pinions, which are each coupled with the gearing of an output shaft w_ab.

Thus, in accordance with the invention, just four gear planes are provided, whereby in each embodiment variation two dual gear planes 5-8, 6-9; 5-8, 7-10 and two single gear planes 6-2, 3-9; 7-3, 4-10 are provided, so that at least one winding-path gear can be shifted via a non-engaged coupling device S_ab1, S_ab2, assigned to the output gear wheels 12, 13.

Thus, the dual clutch transmission has, beside the coupling devices A, B, C, D, E, F which connect a gear wheel and the associated countershaft w_v1, w_v2 in a rotationally fixed manner, at least one coupling device S_ab1, S_ab2, assigned to the output gear wheels 12, 13, on one of the countershafts w_v1, w_v2, which is disengaged when shifting as a winding-path gear, to disconnect the respective output gear 12, 13 from the assigned countershaft w_v1, w_v2.

Independent of the respective embodiment variation, both partial transmissions are used for the first forward gear G1 and the highest forward gear G7, as well as at least one reverse gear, because these are winding-path gears. The first load shifting forward gear is also a winding-path gear. Furthermore, the gear wheel steps i_3 and i_5 of the load shifting forward gears G3 and G5 are positioned together in the first gear plane as the dual gear plane 5-8.

In the first and in the second embodiment variation of the dual clutch transmission, in accordance with FIGS. 1 to 4, the output gear wheel 12 is disengaged from the first countershaft w_v1, when the coupling device S_ab1 on the first countershaft w_v1 is disengaged so that the first forward gear G1 and the seventh forward gear G7 can be shifted as a winding-path gear.

Figure 7:
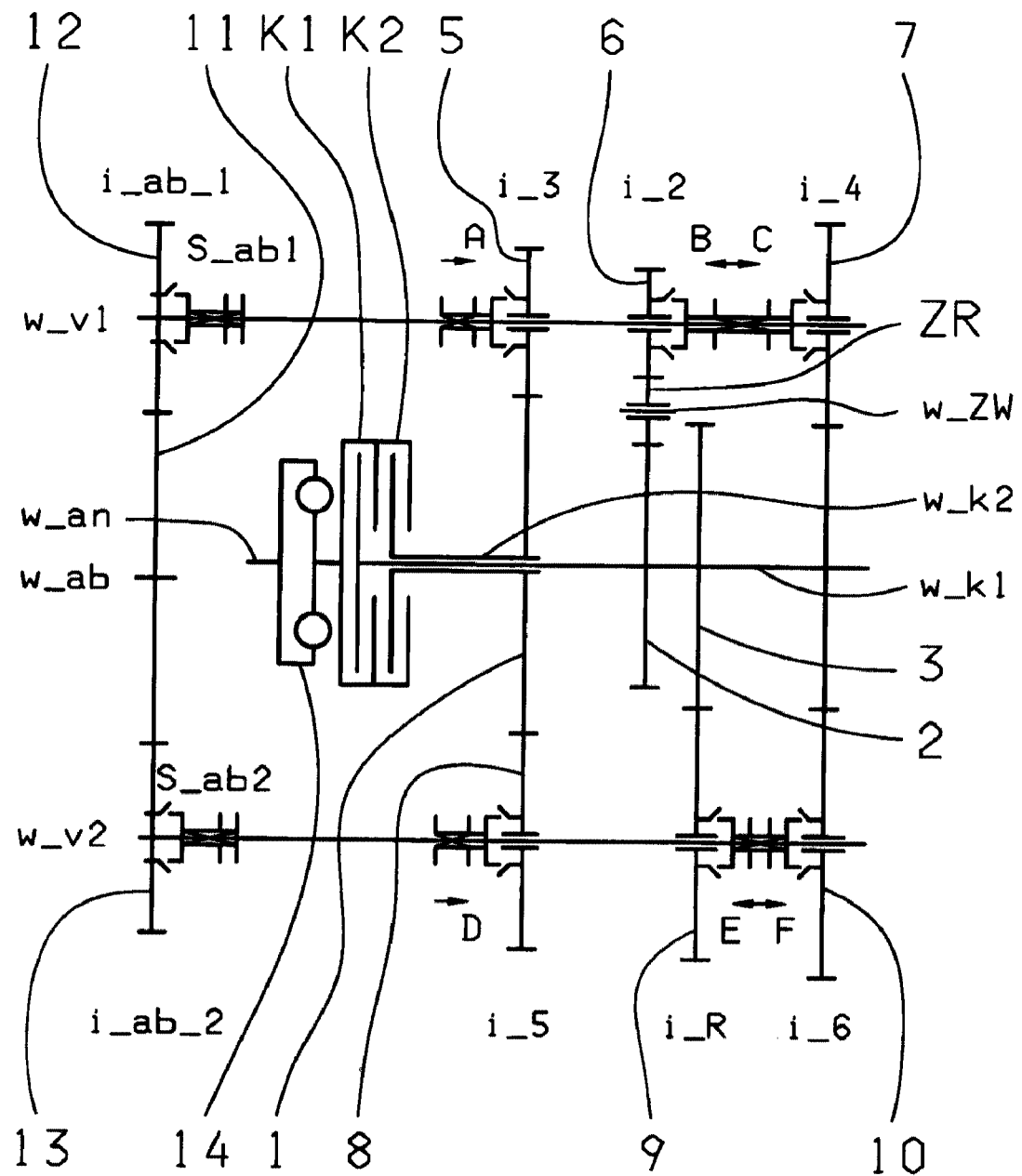
FIG. 7 a schematic view of the fourth embodiment variation of the invented 7-gear dual clutch transmission.

The third embodiment variation of the dual clutch transmission, in accordance with FIGS. 6 and 7, provides that, the output gear wheel 12 is disengaged from the first countershaft w_v1, when the coupling device S_ab1 on the first countershaft w_v1 is disengaged so that the first forward gear G1 can be shifted as a winding-path gear, and that the output gear wheel 13 is disengaged from the second countershaft w_v2, when the coupling device S_ab2 on the second countershaft w_v2 is disengaged, so that the seventh forward gear G7 can be shifted as a winding-path gear.

Finally, the fourth embodiment variation of the dual clutch transmission, in accordance with FIGS. 7 and 8, provides that the output gear wheel 13 is disengaged from the a second countershaft w_v2, when the coupling device S_ab1 is engaged and a coupling device S_ab2 on the second countershaft w_v2 is disengaged so that the first forward gear G1 can be shifted as a winding-path gear, and, when the coupling device S_ab2 is engaged and the coupling device S_ab1 on the first countershaft w_v1, is disengaged such that the output gear wheel 12 is decoupled from the first countershaft w_v1, the seventh forward gear G7 is shifted as a winding-path gear.

Thus, independent of the respective embodiment variation of the dual clutch transmission, the first and the highest forward gear are winding-path gears.

In the first embodiment variation, in accordance with FIG. 1, in the first gear plane, designed as dual gear plane 5-8, the fixed gear wheel 1 on the second transmission input shaft w_K2 meshes with the idler gear 5 on the first countershaft w_v1, and with the idler gear 8 on the second countershaft w_v2. In the second gear plane, designed as single gear plane 6-2, the fixed gear wheel 2 of the first transmission input shaft w_K1 meshes only with the intermediate gear ZR, whereby the intermediate gear ZR enables rotation reversal for the realization of the reverse gears R1, R2. The intermediate gear ZR is rotatably positioned on an intermediate shaft w_zw, whereby the intermediate shaft w_zw, in this example, is positioned in parallel to the countershafts w_v1, w_v2. The intermediate gear ZR meshes also with the idler gear 6 on the first countershaft w_v1. In the third gear plane, designed as single gear plane 3-9, the fixed gear wheel 3 on the first transmission input shaft w_K1 meshes with the idler gear 9 on the second countershaft w_v2. Finally, in the fourth gear plane, designed as a dual gear plane 7-10, the fixed gear wheel 4 on the first transmission input shaft w_K1 meshes with the idler gear 10 on the second countershaft w_v2, and with the idler gear 7 on the first countershaft w_v1. The fourth embodiment variation, in accordance with FIG. 7, differs just by the fact, that the positioning of the intermediate gear ZR, for rotation reversal, is positioned in the third gear plane, designed as a single gear plane 3-9.

Figure 3:
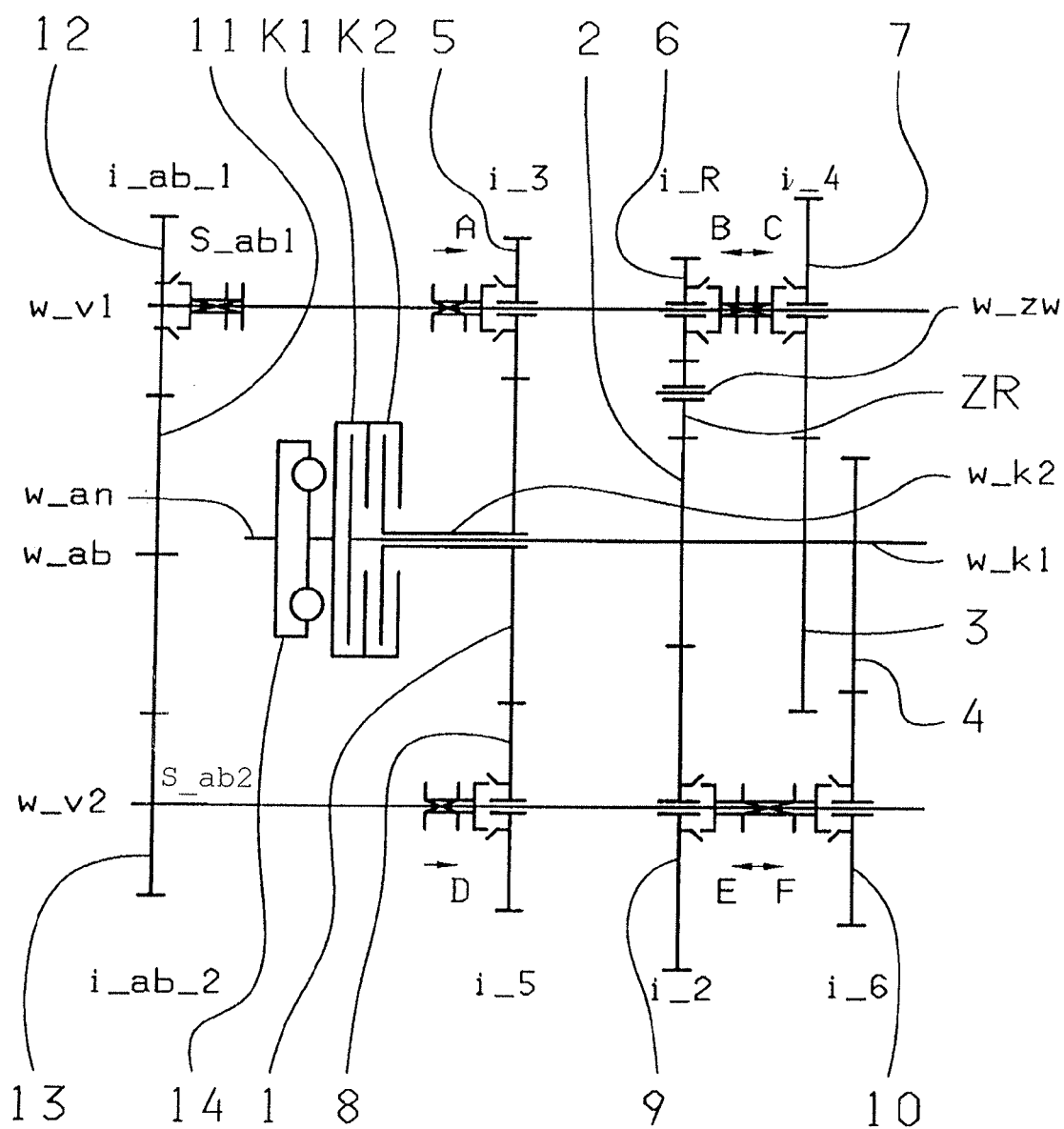
FIG. 3 a schematic view of a second embodiment variation of the invented 7-gear dual clutch transmission.
Figure 5:
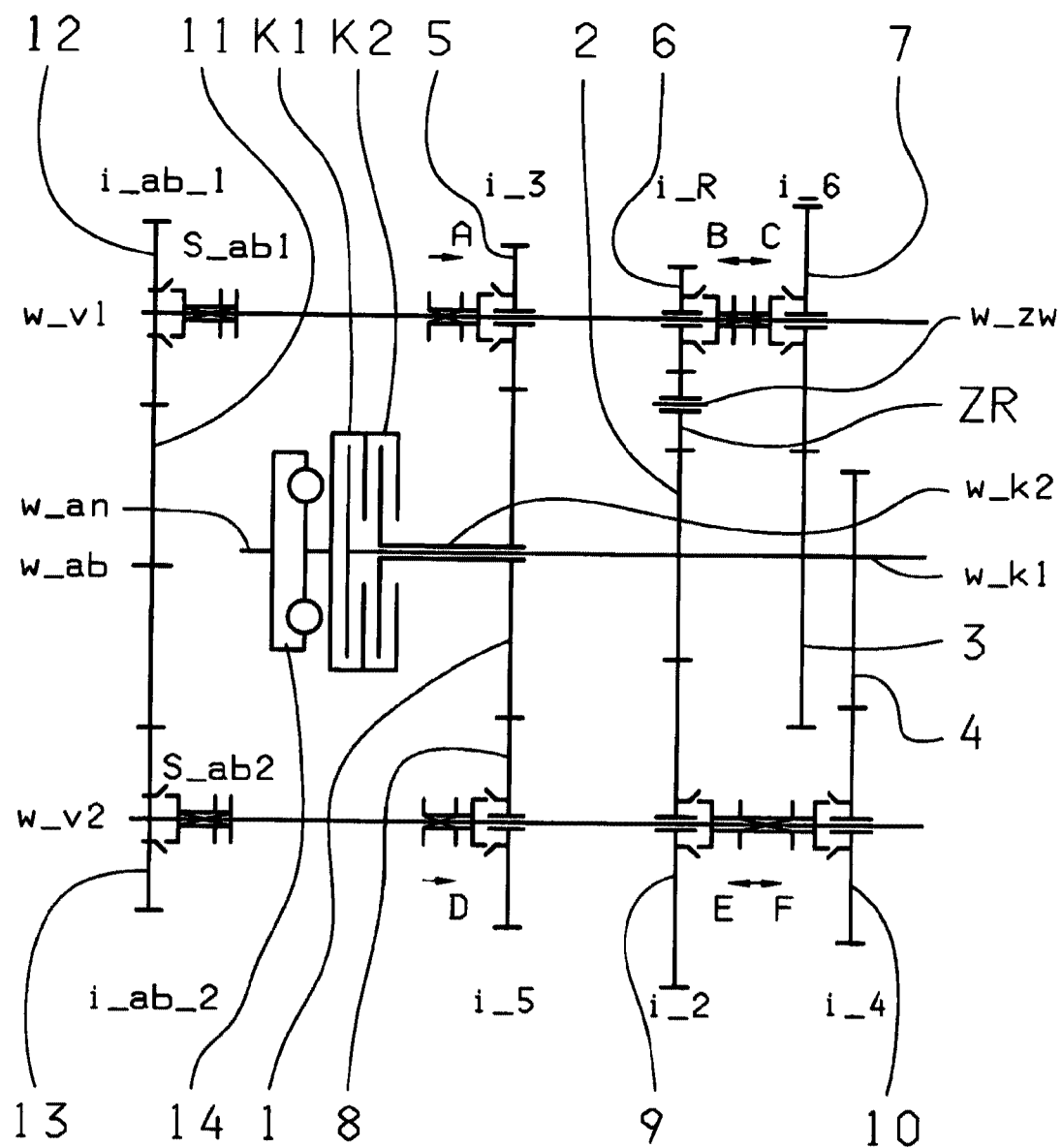
FIG. 5 a schematic view of a third embodiment variation of the invented 7-gear dual clutch transmission.

In the second embodiment variation, in accordance with FIG. 3, as well as in the third embodiment variation, in accordance with FIG. 5, the fixed gear wheel 1 on the second transmission input shaft w_K2 meshes in the first gear plane, designed as dual gear plane 5-8, with the idler gear 5 on the on first countershaft w_v1, and the idler gear 8 on the second countershaft w_v2. In the second gear plane, designed as dual gear plane 6-9, the fixed gear wheel 2 on the first transmission input shaft w_K1 meshes with an intermediate gear ZR, whereby the intermediate gear ZR enables rotation reversal for the realization of a reverse gear R1, R2. The intermediate gear ZR is positioned rotatable on an intermediate shaft w_zw, whereby the intermediate shaft w_zw, in this example, is positioned parallel to the countershafts w_v1, w_v2. The intermediate shaft ZR also meshes with the idler gear 6 on the first countershaft w_v1. Also, the fixed gear wheel 2 on the first transmission input shaft w_K1 meshes with the idler gear 9 on the second countershaft w_v2. In the third gear plane, designed as single gear plane 7-3, the fixed gear wheel 3 on the first transmission input shaft w_K1 meshes with the idler gear 7 on the first countershaft w_v1. Finally, in the fourth gear plane, designed as single gear plane 4-10, the fixed gear wheel 4 on the first transmission input shaft w_K1 meshes with the idler gear 10 on the second countershaft w_v2.

In the first and the fourth embodiment variation, in accordance with FIGS. 1 and 7, on each countershaft w_v1, w_v2, a dual action coupling device B, C; E, F is positioned. On the first countershaft w_v1 the dual action coupling device B, C is positioned between the second gear plane 6-2, designed as single gear plane, and the fourth gear plane 7-10, designed as dual gear plane, and on the second countershaft w_v2, the dual action coupling device E, F is positioned between the third gear plane 3-9, designed as single gear plane, and the fourth gear plane 7-10, designed as dual gear plane.

In the second and third embodiment variation, in accordance with FIGS. 3 and 5, a dual action coupling device B, C; E, F is positioned on each countershaft w_v1, w_v2, whereby the dual action coupling device B, C on the first countershaft w_v1, is positioned between the second gear plane 6-9, designed as dual gear plane, and the third gear plane 7-3, designed as single gear plane, and the dual action coupling device E, F on the second countershaft w_v2 is positioned between the second gear plane 6-9, designed as dual gear plane and the fourth gear plane 4-10, designed as single gear plane.

Independent from the respective embodiment variation, for each dual action operating coupling device B, C; E, F also to single action coupling devices can be provided. Via the coupling device B, the idler gear 6 can be connected with the first countershaft w_v1 and via the coupling device C, the idler gear 7 can be connected with the a first countershaft w_v1. Via the coupling device E, the idler gear 9 can be connected with the second countershaft w_v2, and with the coupling device F, the idler gear 10 can be connected with the second countershaft w_v2.

Furthermore, each embodiment variation can provide that a single action coupling device A be assigned to the first gear plane 5-8 as a dual gear plane, to connect the idler gear 5 with the first countershaft w_v1. Also, a single action coupling device D is assigned to the first gear plane as a dual gear plane 5-8, to connect the idler gear 8 with the second countershaft w_v2.

An integrated output stage is provided in the inventive dual clutch transmission, through the output gear wheel 12 and through the output gear wheel 13, whereby the output gear wheel 12 and the output gear wheel 13 each mesh with a fixed gear wheel 11 on the output shaft w_ab. In the first and second embodiment variation, in accordance with FIGS. 1 and 3, the output gear wheel 12 is shiftable connected, via the coupling device S_ab1, to the first countershaft w_v1, the output gear wheel 13, is connected in a rotationally fixed manner with the second countershaft w_v2. In contrast to the above, in the third and fourth embodiment variation, in accordance with FIGS. 5 and 7, the output gear wheel 12 and the output gear wheel 13, are shiftably connected, via the coupling device S_ab1 or S_ab2, respectively, with the first countershaft w_v1 or the second countershaft w_v2, respectively.

In the presented tables, in accordance with FIGS. 2 and 4, exemplary shifting schemes are presented for the first and second embodiment variations of the 7-gear dual clutch transmission, in accordance with FIGS. 1 and 3.

From the shifting schemes can be seen, that the first forward gear G1 can be shifted via the second clutch K2, via the activated coupling device A, and via the activated coupling device C, and via the activated coupling device E, and as a winding-path gear when the coupling device S_ab1 is disengaged, the second forward gear G2 can be shifted via the first clutch K1 and via the activated coupling device E, and when the coupling device S_ab1 is engaged, the third forward gear G3 can be shifted via the second clutch K2 and via the activated coupling device A, and with engagement of the coupling device S_ab1, the fourth forward gear G4 can be shifted via the first clutch K1 and via the activated coupling device C, and with engagement of the coupling device S_ab1, the fifth forward gear G5 can be shifted via the second clutch K2 and via the activated coupling device D, and with engagement of the coupling device S_ab1, the sixth forward gear G6 can be shifted via the first clutch K1 and via the activated coupling device F, and with engagement of the coupling device S_ab1, and the seventh forward gear G7 can be shifted via the first clutch K1, via the activated coupling device A, via the activated coupling device C, and via the activated coupling device D, and with disengagement of the coupling device S_ab1 as a winding-path gear. In addition, it can be seen from the shifting schemes that a reverse gear R1 can be shifted via the first clutch K1 and via the activated coupling device B.

If, in the first and second embodiment variation, an additional coupling device S_ab2 on the second countershaft w_v2 is assigned to the output gear wheel 13, an additional reverse gear R2 can be shifted as a winding path-gear, by means of the second clutch K2 via the activated coupling device B, via the activated coupling device D, and via the activated coupling device F, when the coupling device S_ab1 is engaged and, if the additional coupling device S_ab2 is disengaged to de-couple the second countershaft w_v2 from the output gear wheel.

In addition, in the first and second embodiment variation of the invention, an additional shifting device K can be positioned on the second countershaft w_v2, so that a low speed gear C1 can be shifted via the first clutch K1 and via the activated coupling device A, as a winding-path gear when the coupling device S_ab1 is engaged and, when the additional shifting device K is engaged, to connect the idler gear 8 with the idler gear 9 on the second countershaft w_v2. For the shifting device K, for instance, a claw, or similar, can be used for connecting the gear wheels. Also, an overdrive gear O1 can be shifted via the second clutch K2 and via the activated coupling device C, as a winding-path gear when the coupling device S_ab1 is engaged, and when the additional shifting device K is engaged.

From the shifting schemes, in accordance with FIGS. 2 and 4, it can be seen that in the first forward gear G1, starting from the second clutch K2, the gear wheel steps i_3, i_4, and i_2 are used, whereby the possibility for the coupling of the two partial transmissions is realized via the disengaged coupling device S_ab1. In the second forward gear G2, only the gear wheel step i_2 is used, in the a third forward gear G3, the gear wheel step i_3, and in the fourth forward gear G4, the gear wheel step i_4, in the fifth forward gear G5, the gear wheel step i_5, and in the sixth forward gear G6, the gear wheel step i_6 is used. In the seventh forward gear G7, the gear wheel steps i_4, i_3 and i_5 are applied, whereby the possibility for coupling of the two partial transmissions is realized via the disengaged coupling device S_ab1. In the reverse gear R1, only the gear wheels step i_R on the second dual gear plane 6-9 is used, the additional, possible reverse gear R2, as a winding-path gear and starting from the second clutch K2, uses the gear wheel steps i_5, i_6, and i_R, whereby the possibility for connecting of the two partial transmissions is realize via the disengaged coupling device S_ab2, which is assigned to the output gear wheel 13 on the second countershaft w_v2. In addition, in the low speed gear C1, starting from the first clutch K1, the gear wheels steps i_2, i_5, and i_3 are used, whereby the two partial transmissions are coupled via the shifting device K on the second countershaft w_v2. In the overdrive gear O1, starting from the second clutch K2, the gear wheels steps i_5, i_2, and i_4 are used, whereby the two partial transmissions are coupled via the shifting device K.

The next to last ratio step, in the first embodiment variation, can be selected in a way, that the driver, in case of a shift-in, has plenty of drive power or torque, respectively, available. Due to the fact that in the second embodiment variation the gear wheels steps of the fourth and the sixth forward gear G4, G6 are each assigned to a single gear plane 7-3, 4-10, the fourth and the sixth forward gear are freely adaptable, and due to the fact that the gear wheel steps of the fourth forward gear can be used with the winding gears G1 and G7, the transmission ratio can be especially well adapted within the range of the forward gears G4 to G7.

FIG. 6 presents a table which shows the shifting scheme for the third embodiment variation of the 7-gear dual clutch transmission in accordance with FIG. 5.

It can be seen from the shifting scheme, that the first forward gear G1 can be shifted via the second clutch K2, via the activated coupling device A, via the activated coupling device C, via the activated coupling device E, as a winding-path gear when the coupling device S_ab2 is engaged and a the coupling device S_ab1 is disengaged, the second forward gear G2 can be shifted via the first clutch K1, and via the activated device E, and when the coupling devices S_ab1 and S_ab2 are engaged, the third forward gear G3 can be shifted via the second clutch K2 and via the activated coupling device A, and when the coupling devices S_ab1 and S_ab2 are engaged, the fourth forward gear G4 can be shifted via the first clutch K1 and via the activated coupling device F, and when the coupling devices S_ab1 and S_ab2 are engaged, the fifth forward gear G5 can be shifted via the second clutch K2 and via the activated coupling device D, and when the coupling devices S_ab1 and S_ab2 are engaged, the sixth forward gear G6 can be shifted via the first clutch K1 and via the activated coupling device C, and when the coupling devices S_ab1 and S_ab2 are engaged, and that the seventh forward gear G7 can be shifted via the second clutch K2, via the activated coupling device C, via the activated coupling device D, and via the activated coupling device F, and as a winding-path gear when the coupling device S_ab1 is engaged and when the coupling device S_ab2 is disengaged. Also, a reverse gear R1 can be realized via the first clutch K1 and via the activated coupling device B, and when the coupling devices S_ab1 and S_ab2 are engaged. Furthermore, the drive gear O2 is realized via the first clutch K1, via the activated coupling device A, via the activated coupling device C, and via the activated coupling device D, and as a winding gear and when the coupling device S_ab2 is engaged and when the coupling device S_ab1 is disengaged.

If, in the third embodiment variation, an additional shifting device K is positioned on the second countershaft w_v2, a first overdrive gear O1 can also be shifted as a winding-path gear via the second clutch K2 and via the activated coupling device F, if an additional shifting device (K) is engaged and when the two coupling devices S_ab1 and S_ab2 are also engaged.

It can be seen in the shifting scheme, in accordance with FIG. 6, that, in the first forward gear G1, starting from the second clutch K2, the gear wheel steps i_3, i_6, and i_2 are used, whereby the possibility of coupling the two partial transmissions is realized through the disengaged coupling device S_ab1. In the second forward gear G2, only the gear wheel step i_2 is used, in the third forward gear G3, the gear wheel step i_3, in the fourth forward gear G4, the gear wheel step i_4, in the fifth forward gear G5, the gear wheel step i_5, and in the a sixth forward gear G6, the gear wheel step i_6 is used. In the seventh forward gear G7, the gear wheel steps i_5, i_4, and i_6 are used, whereby the possibility of coupling the two partial transmissions is realized via the engaged coupling device S_ab1 and the disengaged coupling device S_ab2. In the reverse gear R1, only the gear wheel step i_R in the second dual gear plane 6-9 is used. In the overdrive gear O1, starting from the second clutch K2, the gear wheel steps i_5, i_2, and i_4 are used, the two partial transmissions are coupled via the shifting device K, and the two coupling devices S_ab1 and S_ab2 are engaged. Finally, in an additional overdrive gear O2, the gear wheel steps i_6, i_3, and i_5 are used, and for coupling of the two partial transmissions, the coupling device S_ab1 is disengaged and the coupling device S_ab2 is engaged.

A power shiftable 7-gear transmission is proposed in the third embodiment variation, in which, through the use of the coupling device S_ab1, an additional overdrive gear O1 becomes available. Due to the fact that the gear steps 1-2 and 2-3 can be large, the additional gear steps can comfortably be kept small.

From the table in FIG. 8, an exemplary shifting scheme for the fourth embodiment variation of the 7-gear dual clutch transmission, in accordance with FIG. 7, is shown.

From the shifting schemes it can be seen, that the first forward gear G1 can be shifted via the second clutch K2, via the activated coupling device B, via the activated coupling device D, and via the activated coupling device F, and as a winding-path gear, with engagement of the coupling device S_ab1 and disengagement of the coupling device S_ab2, the second forward gear G2 can be shifted via the first clutch K1 and via the activated coupling device B, with engaged coupling devices S_ab1 and S_ab2, the third forward gear G3 can be shifted via the second clutch K2 and via the activated coupling device A, and with engaged coupling devices S_ab1 and S_ab2, the fourth forward gear G4 can be shifted via the first clutch K1 and via the activated coupling device C, and when the coupling devices S_ab1 and S_ab2 are engaged, the fifth forward gear G5 can be shifted via the second clutch K2 and via the activated coupling device D, and when the coupling devices S_ab1 and S_ab2 are engaged, the sixth forward gear G6 can be shifted via the first clutch K1 and via the activated coupling device F, and when the coupling devices S_ab1 and S_ab2 are engaged and the seventh forward gear G7 can be shifted via the first clutch K1, via the activated coupling device A, via the activated coupling device C, and via the activated coupling device D, and as a winding gear when the coupling device S_ab1 is disengaged and the coupling device S_ab2 is engaged. Also, a reverse gear R4 can be shifted via the first clutch K1 and via the activated coupling device E, and when the coupling devices S_ab1 and S_ab2 are engaged.

If, in the fourth embodiment variation, an additional shifting device K is positioned on the second countershaft w_v2, an additional reverse gear R1 can be shifted via the second clutch K2 and via the activated coupling device B, and when the coupling devices S_ab1 and S_ab2 are engaged, as a winding-path gear, when the additional shifting device K is engaged, to connect the idler gear 8 with the idler gear 9 on the second countershaft w_v2 and couple the two partial transmissions. Also, an additional reverse gear R2 can be shifted via the second clutch K2 and via the activated coupling device C, and as a winding-path gear when the coupling devices S_ab1 and S_ab2 are engaged, and when the additional shifting device K is engaged. Furthermore, another reverse gear R3 can be shifted via a second clutch K2 and via the activated coupling device F as a winding-path gear, when the additional shifting device K is also engaged.

If, in the fourth embodiment variation, a shifting device I is positioned on the first countershaft w_v1, an overdrive gear O1 can be realized as a winding-path gear via the second clutch K2 and via the activated coupling device F, if the additional shifting device I is engaged, to connect the idler gear 5 with the idler gear 6 on the first countershaft w_v1 to couple both partial transmissions, whereby the coupling devices S_ab1 and S_ab2 are engaged.

From the shifting scheme, in accordance with FIG. 8, it can be seen in particular that in the first forward gear G1, starting from the second clutch K2, the idler gear steps i_5, i_6, and i_2 are used, whereby the possibility of coupling of the two partial transmissions is realized through the disengaged coupling device S_ab2. In the second forward gear G2, only the gear wheel step i_2, in the third forward gear G3, the gear wheel step i_3, and the fourth forward gear G4, the gear wheel step i_4, in the fifth forward gear G5, the gear wheel step i_5, and in the sixth forward gear G6, the gear wheel step i_6 is used. In the seventh forward gear G7, the gear wheel steps i_4, i_3, and i_5 are used, whereby coupling the two partial transmissions is realized via the disengaged coupling device S_ab1. In a reverse gear R1, as a winding-path gear, the gear wheel steps i_5, i_R, i_2, are used, in an additional, possible reverse gear R2, as a winding-path gear, the gear wheels steps i_5, i_R, and i_4, in another reverse gear, as a winding-path gear, the gear wheels steps i_5, i_R, and i_6, and in another, additional reverse gear R4, only the gear wheels step i_R is used. Also, in the overdrive gear O1, starting with the second clutch K2, the gear wheel steps i_3, i_2, and i_6 are used, whereby the two partial transmissions are coupled via the shifting device I.

Due to the fact, that the gear wheel step of the second forward gear G2 is positioned together, on the first countershaft w_v1, with the gear wheel steps of the forward gears G3 and G4, that the second forward gear G2 is assigned to the single gear plane 6-2, and that the first forward gear G1 is a winding-path gear, via the gear wheel steps of the forward gears G2, G3, and G4, gear wheel shifting can well be. In addition, advantages arise in regard to the gearing configuration and in regard to the bearing of the shaft and to the shaft design.

In summary, it can be seen in the first embodiment variation, in accordance with FIGS. 1 and 2, in the first gear plane 5-8, designed as dual gear plane, that the idler gear 5 can be used for four forward gears G1, G3, G7, C1, and the idler gear 8 can be used for four forward gears G5, G7, C1, O1 as well as for a reverse gear R2. In the second gear plane 6-2, designed as single gear plane, the idler gear 6 can only be used for two reverse gears R1, R2. Also, in the third gear plane 3-9, designed as single gear plane, the idler gear 9 can be used for four forward gears G1, G2; C1, O1. Finally, in the fourth gear plane 7-10, designed as dual gear plane, the idler gear 7 can be used for 4 forward gears G1, G4, G7, O1, and the idler gear 10 can be used for the forward gear G6, as well as for a reverse gear R2.

The second embodiment variation, in accordance with FIGS. 3 and 4, only differs from the first embodiment variation in regard to the use of the different idler gears and the fact, that the second gear plane 6-9 is a dual gear plane, and the fourth gear plane 4-10 is a single gear plane.

In the third embodiment variation, in accordance with FIGS. 5 and 6, it can be seen in summary, that in the first gear plane 5-8, designed as dual gear plane, the idler gear 5 can be used for the three forward gears G1, G3, O2, and the idler gear 8 can be used for the four forward gears G5, G7, O1, O2. In the second gear plane 6-9, designed as dual gear plane, the idler gear 6 can be used for a reverse gear R1 and the idler gear 9 can be used for three forward gears G1, G2, O1. Also, in the third gear plane 7-3, designed as single gear plane, the idler gear 7 can be used for four forward gears G1, G6, G7, O2. Finally, in the fourth gear plane 4-10, designed as single gear plane, the idler gear 10 can be used for three forward gears G4, G7, O1.

In the fourth embodiment variation, in accordance with FIGS. 7 and 8, it can be seen in summary, that in the first gear plane 5-8, designed as dual gear plane, the idler gear 5 can be used for three forward gears G3, G7, O1, and the idler gear 8 can be used for three forward gears G1, G5, G7, as well as for three reverse gears R1, R2, R3. In the second gear plane 6-2, designed as single gear plane, the idler gear 6 can be used for three forward gears G1, G2, O1, as well as for a reverse gear R1. Also in the third gear plane 3-9, designed as single gear plane, the idler gear 9 can be used for four reverse gears R1, R2, R3, R4. Finally, in the fourth gear plane 7-10, designed as dual gear plane, the idler gear 7 can be used for two forward gears G4, G7, as well as for a reverse gear R2, and the idler gear 10 can be used for three forward gears G1, G6, O1, as well as for a reverse gear R3.

In all embodiment variations of the dual clutch transmission and due to the provided multiple use of certain idler gears, less gear planes are required and therefore less components, but still having the same amount of gears, resulting in an advantageous construction space saving and in a cost reduction.

Independent from the respective embodiment variation, the numeral "1" in a box of the respective table of the shift schemes means that the associated clutch K1, K2, or the associated coupling devices A, B, C, D, E, F respectively, or the associated shifting devices K, I, respectively, are engaged. In contrast, an empty box in the respective table of the shift schemes means that the associated clutch K1, K2, or the associated coupling device A, B, C, D, E, F, respectively, or the associated shifting device K, I, respectively, are disengaged.

Deviating from the previously mentioned rules, it applies for the coupling device S_ab1, or S_ab2, respectively, assigned to a drive gear wheel 12 or gear wheel 13, respectively, that the coupling device S_ab1, or S_ab2, respectively, in case of an empty box in the associated table of the shift schemes, must be disengaged but that, a box having the numeral "1", depending on the gear in a first group of gears, the coupling device S_ab1, or S_ab2, respectively, must be engaged, and in a second group of gears, the coupling device S_ab1, or S_ab2, respectively, can be both disengaged or engaged. In addition, there is the possibility in many cases to add additional coupling devices or shifting devices, without affecting the flow of force. A gear pre-selection is hereby enabled.

REFERENCE CHARACTERS

1 Fixed Wheel on the second transmission input shaft
2 Fixed Wheel on the first transmission input shaft
3 Fixed Wheel on the first transmission input shaft
5 Idler gear on the first countershaft
6 Idler gear on the first countershaft
7 Idler gear on the first countershaft
8 Idler gear on the second countershaft
9 Idler gear on the second countershaft
10 Idler gear on the second countershaft
K1 first clutch
K2 second clutch
w_an Drive Shaft
w_ab Output Shaft
w_v1 first Countershaft
w_v2 second Countershaft
A Coupling Device
B Coupling Device
C Coupling Device
D Coupling Device
E Coupling Device
F Coupling Device
i_1 Gear Wheel Step, first forward gear
i_2 Gear Wheel Step, second forward gear
i_3 Gear Wheel Step, third forward gear
i_4 Gear Wheel Step, fourth forward gear
i_5 Gear Wheel Step, fifth forward gear
i_6 Gear Wheel Step, sixth forward gear
G1 First forward gear
G2 Second forward gear
G3 Third forward gear
G4 Fourth forward gear
G5 Fifth forward gear
G6 Sixth forward gear
C1 Low Speed Gear
Overdrive Gear
R1 Reverse Gear
R2 Reverse Gear
R3 Reverse Gear
w_zw Intermediate Shaft
ZR Intermediate Gear
11 Fixed Gear of the Drive Shaft
12 Output Gear Wheel of the first Countershaft
13 Output Gear Wheel of the second Countershaft
14 Torsion Vibration Damper
ZS Gear Wheel Step in use
S_ab1 Coupling Device, optional
S_ab2 Coupling Device, optional
K Shifting device
I Shifting device The invention claim is:
1. A double clutch transmission comprising:
first and second clutches (K1, K2) each having an input side connected to a drive shaft (w_an) and output respectively connected to one of first and second transmission input shafts (w_K1, w_K2) arranged coaxially with one another;
at least first and second countershafts (w_v1, w_v2) rotatably supporting a plurality of idler gear wheels (5, 6, 7, 8, 9, 10)
a plurality of fixed gear wheels (1, 2, 3, 4) being connected in a rotationally fixed manner to one of the first and the second transmission input shafts (w_K1, w_K2) and each engaging at least one of the plurality of idler gear wheels (5, 6, 7, 8, 9, 10);
a plurality of coupling devices (A, B, C, D, E, F) for each coupling one of the idler gear wheels (5, 6, 7, 8, 9, 10) in a rotationally fixed manner to a countershaft (w_v1, w_v2);
a respective drive output gear wheel (12, 13) being supported on each of the first and the second countershafts (w_v1, w_v2) and engaging gearing of a drive output shaft (w ab) such that several power shiftable forward gears (1, 2, 3, 4, 5, 6) and at least one reverse gear (R1) are engagable;
first and second dual gear planes (5-8, 7-10; 5-8, 6-9), each of the first and the second dual gear planes comprising first and second idler gear wheels (5, 8, 9, 7, 10) with the first idler gear wheel being supported on the first countershaft (w_v1, w_v2) and the second idler gear wheel being supported on the second countershaft (w_v2), and each of the first and the second idler gear wheels (5, 8, 9, 7, 10) engaging a fixed gear wheel (1, 2, 3, 4) connected to one of the first and the second transmission input shafts (w_K1, w_K2); at least one of the first and the second idler gear wheels (5, 6, 7, 8, 9, 10) in each of the first and second dual gear planes (5-8, 7-10; 5-8, 6-9) being utilized for implementing at least two gears; and
first and second single gear planes (6-2, 3-9; 7-3, 4-10), each of the first and the second single gear planes comprising an idler gear wheel (5, 8; 6, 9; 7, 10) which is supported on one of the first and the second countershafts (w_v1, w_v2) and engages a fixed gear wheel (1, 2, 3, 4) connected to one of the first and the second transmission input shafts (w_K1, w_K2) such that at least one winding-path gear can be implemented via at least one, non-engaged output coupling device (S_ab1, S_ab2), assigned to one of the drive output gear wheels (12, 13).

2. The double clutch transmission according to claim 1, wherein a first forward gear (G1) and a seventh forward gear (G7) are shifted as a winding-path gear when the output coupling device (S_ab1), on the first countershaft (w_v1), is disengaged and the output gear wheel (12) of the first countershaft (w_v1) is decoupled from the first countershaft (w_v1).

3. The double clutch transmission according to claim 1, wherein a first forward gear (G1) and a second overdrive gear (02) are shifted as a winding-path gear when the output coupling device (S_ab1) on the first countershaft (w_v1) is disengaged and the output gear wheel (12) of the first countershaft (w_v1) is decoupled from the first countershaft (w_v1); and
 a seventh forward gear(G7) is shifted as a winding-path gear when the output coupling device (S_ab2), on the second countershaft (w_v2), is disengaged and the output gear wheel (13) on the second countershaft (w_v2) is decoupled from the second countershaft (w_v2).

4. The double clutch transmission system according to claim 1, wherein a seventh forward gear (G7) is shifted when the coupling device (S_ab1), on the first countershaft (w_v1), is disengaged, and the output gear wheel (12), on the first countershaft (w_v1), is decoupled from the first countershaft (w_v1); and
 a first forward gear (G1) is shifted as a winding-path gear when the coupling device (S_ab2), on the second countershaft (w_v2), is disengaged and the output gear wheel (13), on the second countershaft (w_v2) is decoupled from the second countershaft (w_v2).

5. The double clutch transmission according to claim 1, wherein a first gear plane is the first dual gear plane (5-8) which comprises a first fixed gear wheel (1) on the second transmission input shaft (w_K2) of a second partial transmission;
 second and third gear planes are the first and the second single gear planes (6-2, 3-9); and
 a fourth gear plane is the second dual gear plane (7-10) which comprises three fixed gear wheels (2, 3, 4) on the first transmission input shaft (w_K1) of a first partial transmission.

6. The dual clutch transmission according to claim 1, wherein a first gear plane is the first dual gear plane (5-8) which comprises a fixed gear wheel (1) on the second transmission input shaft (w_K2) of a second partial transmission;
 a second gear plane is the second dual gear plane (6-9); and
 third and fourth gear planes are the first and the second single gear planes (7-3, 4-10) which respectively comprise three fixed gear wheels (2, 3, 4) on the first transmission input shaft (w_K1) of a first partial transmission.

7. The dual clutch transmission according to claim 1, wherein
 a first forward gear (G1) is engaged as a winding-path gear by engagement of the second clutch (K2), a first coupling device (A), a second coupling device (C), a fourth coupling device (E) and disengagement of an output coupling device (S_ab1);
 a second forward gear (G2) is engaged by engagement of the first clutch (K1) and the fourth coupling device (E);
 a third forward gear (G3) is engaged by engagement of the second clutch (K2) and the first coupling device (A);
 a fourth forward gear (G4) is engaged by engagement of the first clutch (K1) and the second coupling device (C);
 a fifth forward gear (G5) is engaged by engagement of the second clutch (K2) and a third coupling device (D),
 a sixth forward gear (G6) is engaged by engagement of the first clutch (K1) and a fifth coupling device (F), and
 a seventh forward gear (G7) is engaged as winding-path gear by engagement of the first clutch (K1), the first coupling device (A), the second coupling device (C), the third coupling device (D), and disengagement of the output coupling device (S_ab1).

8. The dual clutch transmission according to claim 7, wherein a reverse gear (R1) is engaged by engagement of the first clutch (K1) and a sixth coupling device (B).

9. The dual clutch transmission according to claim 1, wherein
 a first forward gear (G1) is engaged as a winding-path gear by engagement of the second clutch (K2), a first coupling device (A), a second coupling device (C), a fourth coupling device (E) and disengagement of a first output coupling device (S_ab1);
 a second forward gear (G2) is engaged by engagement of the first clutch (K1) and the fourth coupling device (E);
 a third forward gear (G3) is engaged by engagement of the second clutch (K2) and the first coupling device (A);
 a fourth forward gear (G4) is engaged by engagement of the first clutch (K1) and a fifth coupling device (F);
 a fifth forward gear (G5) is engaged by engagement of the second clutch (K2) and a third coupling device (D),
 a sixth forward gear (G6) is engaged by engagement of the first clutch (K1) and the second coupling device (C),
 a seventh forward gear (G7) is engaged as a winding-path gear by engagement of the second clutch (K2), the second coupling device (C), the third coupling device (D), the fifth coupling device (F) and disengagement of a second output coupling device (S_ab2).

10. The double clutch transmission according to claim 9, wherein a reverse gear (R1) is engaged by engagement of the first clutch (K1) and a sixth coupling device (B); and
 an overdrive gear (02) is engaged as a winding gear by engagement of the first clutch (K1), the first coupling device (A), the second coupling device (C), the third coupling device (D) and disengagement of the first output coupling device (S_ab1).

11. The double clutch transmission according to claim 1, wherein
 a first forward gear (G1) is engaged as a winding gear by engagement of the second clutch (K2), a second coupling device (B), a fourth coupling device (D), a fifth coupling device (F), and disengagement of a second output coupling device (S_ab2);
 a second forward gear (G2) is engaged by engagement of the first clutch (K1) and the second coupling device (B);
 a third forward gear (G3) is engaged by engagement of a first coupling device (A);
 a fourth forward gear (G4) is engaged by engagement of the first clutch (K1) and a third coupling device (C);
 a fifth forward gear (G5) is engaged by engagement of the second clutch (K2) and the fourth coupling device (D);
 a sixth forward gear (G6) is engaged by engagement of the first clutch (K1) and the fifth coupling device (F),
 a seventh forward gear (G7) is engaged as a winding-path gear by engagement of the first clutch (K1), the first coupling device (A), the third coupling device (C), the fourth coupling device (D) and disengagement of the first output coupling device (S_ab1).

12. The double clutch transmission according to claim 11, wherein a reverse gear (R4) is engaged by engagement of the first clutch (K1) and a sixth coupling device (E).

* * * * *